(12) United States Patent
Alpha

(10) Patent No.: US 6,947,920 B2
(45) Date of Patent: Sep. 20, 2005

(54) METHOD AND SYSTEM FOR RESPONSE TIME OPTIMIZATION OF DATA QUERY RANKINGS AND RETRIEVAL

(75) Inventor: Shamim A. Alpha, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 388 days.

(21) Appl. No.: 09/885,356

(22) Filed: Jun. 20, 2001

(65) Prior Publication Data

US 2003/0028520 A1 Feb. 6, 2003

(51) Int. Cl.⁷ .............................................. G06F 17/30
(52) U.S. Cl. ................................................ 707/1; 707/4
(58) Field of Search ...................... 707/1–10; 715/500.1

(56) References Cited

U.S. PATENT DOCUMENTS

| | | | | |
|---|---|---|---|---|
| 5,293,552 A | * | 3/1994 | Aalbersberg | 707/5 |
| 6,161,102 A | * | 12/2000 | Yanagihara et al. | 707/3 |
| 6,460,034 B1 | * | 10/2002 | Wical | 707/5 |
| 6,549,897 B1 | * | 4/2003 | Katariya et al. | 707/5 |

* cited by examiner

Primary Examiner—Uyen Le
Assistant Examiner—Susan Y. Chen
(74) Attorney, Agent, or Firm—McDonald Hopkins Co., LPA

(57) ABSTRACT

A method and system for optimizing response time for data query rankings and retrieval is provided. In response to a received search query that contains one or more terms, an information retrieval system identifies a candidate set of documents that match any of the terms. Terms are assigned a term weight making them more or less relevant in relation to other terms. A ranking logic defines score bins from a total score range based on possible matched term weights. A relationship is established that classifies a document into a score bin based on a sum of term weights from matched terms. Documents that match more term weights have higher total relevance scores than documents that match less term weights. The most relevant documents are retrievable without having to retrieve the entire set of candidate documents and without having to compute total relevance scores for all the candidate documents.

23 Claims, 2 Drawing Sheets

METHOD AND SYSTEM FOR RESPONSE TIME OPTIMIZATION OF DATA QUERY RANKINGS AND RETRIEVAL

FIELD OF THE INVENTION

The invention relates to the information retrieval and relevance ranking arts. It finds particular application to a method and system of optimizing the response time for ranking and retrieving documents from a search query. It will be appreciated that the present invention will find application in any domain where the final ranking of an object depends on one or more of its attributes.

BACKGROUND OF THE INVENTION

The World wide web has dramatically changed the requirements from information retrieval engines such as Oracle Text of the Oracle Corporation. Recent research shows that web users rarely look beyond the first two pages from a candidate hitlist with a total of twenty hits. Furthermore, users expect subsecond response time (regardless of the promised accuracy of the results). With these types of expectations, response time is of paramount importance. At the same time, since typical web users are not trained in information retrieval, it is imperative that search applications provide very forgiving syntax (or free text query) and deliver a reasonable hitlist.

A solution provided by Oracle Text is the ABOUT operator which accepts short free text queries and finds relevant documents using Oracle Text knowledge based linguistic retrieval system. The ABOUT operator internally uses ACCUMULATE (ACCUM) operator to rank queries with multiple nonstop words (stopwords are words like 'is', 'am', 'are', 'when' etc.). The response time and relevance ranking of the ABOUT query depends on the effectiveness of the ACCUM operator. One problem is slow response times for queries involving a few non-stopwords and unpredictable non-intuitive relevance rankings for queries involving more than one non-stopword. Both of these problems are attributable to the ACCUM operator scoring semantics.

In other prior information retrieval and ranking systems, even when a user is interested in only a few most relevant documents, the ranking system has to retrieve and evaluate an exact relevance score for every single candidate document identified by the search. In a query, the presence of a single non-restrictive term forces the system to evaluate an exact relevance score for an extremely high number of documents. This is required because the prior systems can not identify the most relevant documents until the scores for all the documents were computed. The reason for this problem is that there is no necessary relation between the final score range of a document and the number of children or total weight matched.

The present invention provides a new and useful method and system that optimizes the response time and relevance rankings for search queries that cures the above problems and others.

SUMMARY OF THE INVENTION

According to one embodiment of the present invention, a method of optimizing a response time for retrieving relevant documents from a set of candidate documents is provided. The candidate documents are identified in response to a search query where the search query includes one or more terms. A term weight is assigned to each of the terms in the search query. Documents are associated to a relevance score bin based on a total matched term weight that is based on a sum of the term weights of the matched terms in the search query, where a document that matches a first total term weight is associated to a more relevant score bin than a document that matches a second total term weight less than the first total term weight. A set of most relevant documents are then retrieved based on the association to the relevance score bins having a highest relevance score without retrieving other candidate documents.

According to another embodiment of the present invention, an information retrieval system is provided. The system includes logic for processing a search query that has one or more terms. A document retrieval logic identifies candidate documents that match the search query. A ranking logic assigns a term weight to each of the terms of the search query and associates each combination of matched query term weights to a relevance score range. The ranking logic also groups the candidate documents based on the total matched term weight, which is based on a sum of the term weights of the matched terms in the search query, where a document that matches a first total term weight is associated to a more relevant score range than a document that matches a second total term weight that is less than the first total term weight. A retrieval logic then retrieves a set of relevant documents associated to the relevance score ranges having a greatest matched term weight without receiving the candidate documents from other relevance score ranges.

One advantage of the present invention is that response time is improved for processing search queries.

Another advantage of the present invention is that the most relevant documents are identifiable without having to retrieve all candidate documents thus reducing the number of retrievals.

Still further advantages of the present invention will become apparent to those of ordinary skill in the art upon reading and understanding the following detailed description of the preferred embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DESCRIPTION OF ILLUSTRATED EMBODIMENT

The following includes definitions of exemplary terms used throughout the disclosure. Both singular and plural forms of all terms fall within each meaning:

"Document", as used herein, generally refers to an object being searched for. It includes but is not limited to one or more electronic documents, web pages, network addresses or links, database addresses or records, or any objects (text or non-text) that have one or more attributes that can be searched.

"Software", as used herein, includes but is not limited to one or more computer executable instructions, routines, algorithms, modules or programs including separate applications or from dynamically linked libraries for performing functions as described herein. Software may also be implemented in various forms such as a servlet, applet, stand-alone, plug-in or other type of application. Software can be maintained on various computer readable mediums as is known in the art.

"Logic", as used herein, includes but is not limited to hardware, software and/or combinations of both to perform a function.

"Network", as used herein, includes but is not limited to the internet, intranets, Wide Area Networks (WANs), Local Area Networks (LANs), and transducer links such as those using Modulator-Demodulators (modems).

"Internet", as used herein, includes a wide area data communications network, typically accessible by any user having appropriate software.

"Intranet", as used herein, includes a data communications network similar to an internet but typically having access restricted to a specific group of individuals, organizations, or computers.

Figure 1:
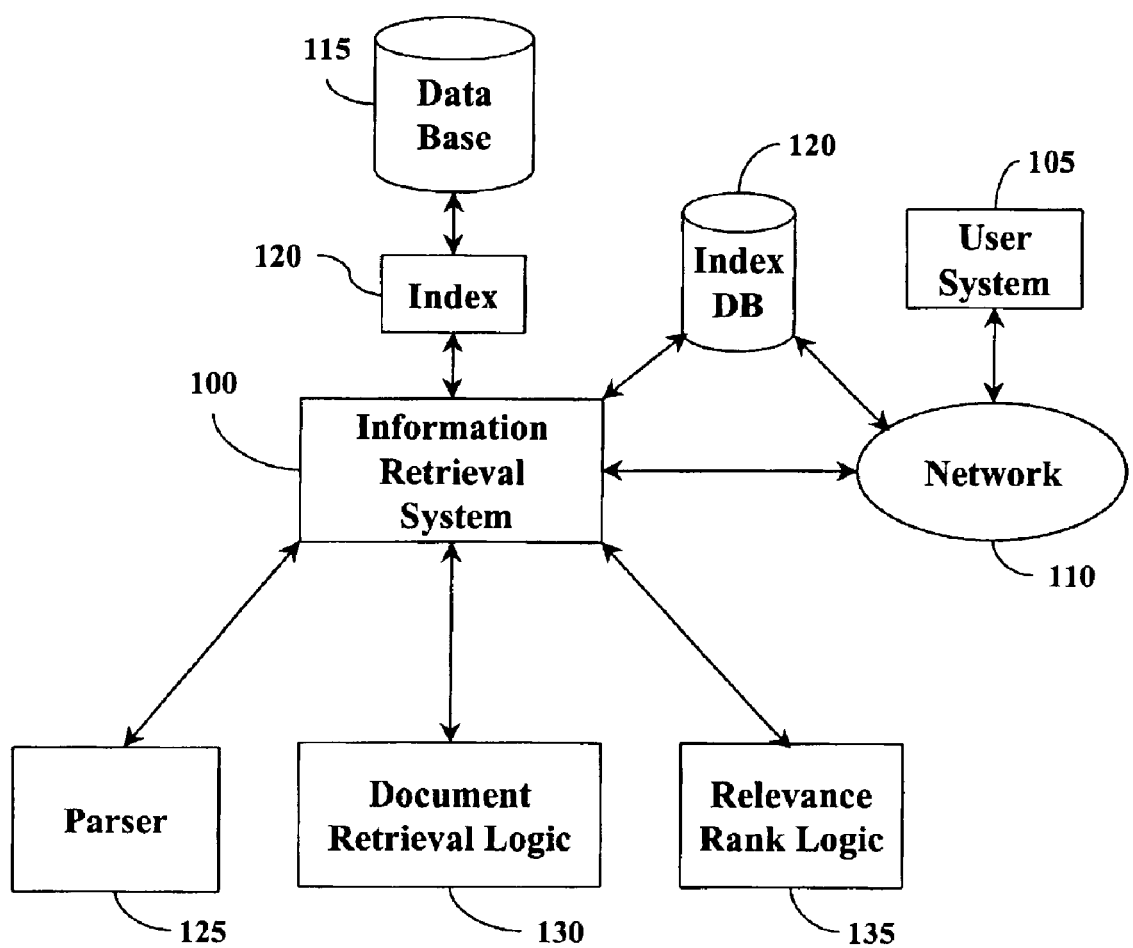
FIG. 1 is an exemplary overall system diagram of an information retrieval and ranking system in accordance with the present invention.

Illustrated in FIG. 1 is an exemplary overall system diagram in accordance with the present invention. An information retrieval system 100 receives and processes search queries from a user system 105 that is trying to locate information on a network 110 or from a particular database 115. The information retrieval system 100 includes, for example, a search engine that is a remotely accessible software program that lets a user perform keyword searches for information on the network. An exemplary retrieval system is Oracle Text. The retrieval system 100 may also include or use one or more pre-generated indexes 120 that associate keys to web pages, addresses, documents or other objects accessible through the network 110 or database 115 as is known in the art. In response to a search query, the retrieval system 100 identifies a candidate set of documents that match or possibly match the criteria of the search query.

The information retrieval system 100 is embodied as software executable by a computer system. The computer system (not shown) generally may take many forms, from a configuration including a variety of processing units, networked together to function as a integral entity, to a single computer, e.g., a personal computer, operational in a stand-alone environment. The present invention can be embodied in any of these computer system configurations. As known in the art, computer systems may include a variety of components and devices such as a processor, memory, data storage, data communications buses, and a network communications device.

A search query typically includes one or more keywords, phrases, or attributes (text or non-text) that represent subject matter or content that a user wishes to locate. A keyword, phrase or attribute will be referred to as a "term." When a search query is received, a parser 125 parses the query to identify the terms. If desired, certain terms can be eliminated such as pronouns or prepositions. The present invention is particularly suited for queries that are in a free form that allows a user to simply list one or more terms with little or no required syntax. Typical free text queries match documents that contain any one of the query terms. In other words, the search applies an "OR" operation between the query terms. This may result in a very large set of candidate documents to be retrieved, thus, resulting in a slower response time and retrieving documents that have questionable relevance ranking scores.

With further reference to FIG. 1, document retrieval logic 130 identifies documents from the index database that match the search query and determines intersections of documents matching multiple terms. A ranking logic 135 ranks each document based on its relevance to the search query and the documents are displayed to the user as a hitlist ordered by the most relevant documents. Ranking includes computing, for each document, a term relevance score based on the document's relevance to each matched term and a term weight for each term. The term relevance score can be computed in many ways to reflect the relevance of a document's content to a term. It may be based on, for example, a number of occurrences of the term in the document, a link analysis of pages that reference the document, font analysis of text within the document, etc.

The term weight for a term is based on an occurrence frequency of the term. In particular, a term that is uncommon (e.g. occurs infrequently) is given a greater term weight than a term that is common (e.g. occurs frequently). Thus, a document that matches an uncommon query term should be more relevant than if the document only matches a common query term. A known technique for determining term weight in this manner is inverse frequency scoring. This technique adjusts the relevance of a document by increasing its relevance if the document matches an uncommon term.

A final relevance score for a document is a function of the term relevance score and the term weight for each query term the document matches. However, before the final relevance score is computed, the ranking logic 135 establishes a relationship between the total term weight matched by a document, which is based on a sum of the term weights of the terms in the query that are matched by the document, and a range of final relevance scores that can be assigned to the document. Thus, the total matched term weight computed for a document is a primary factor for determining the final relevance score of the document. In this manner, a document that matches a first total term weight from the query will always have a greater relevance score than a document that matches a second total term weight that is loss than the first total term weight. This is described in greater detail below. As a result of this relationship, the most relevant documents can be identified without having to compute the relevance scores of the entire set of candidate documents. Thus, a small set of most relevant documents can be retrieved without having to retrieve the entire set of candidate documents thereby increasing response time.

Figure 2:
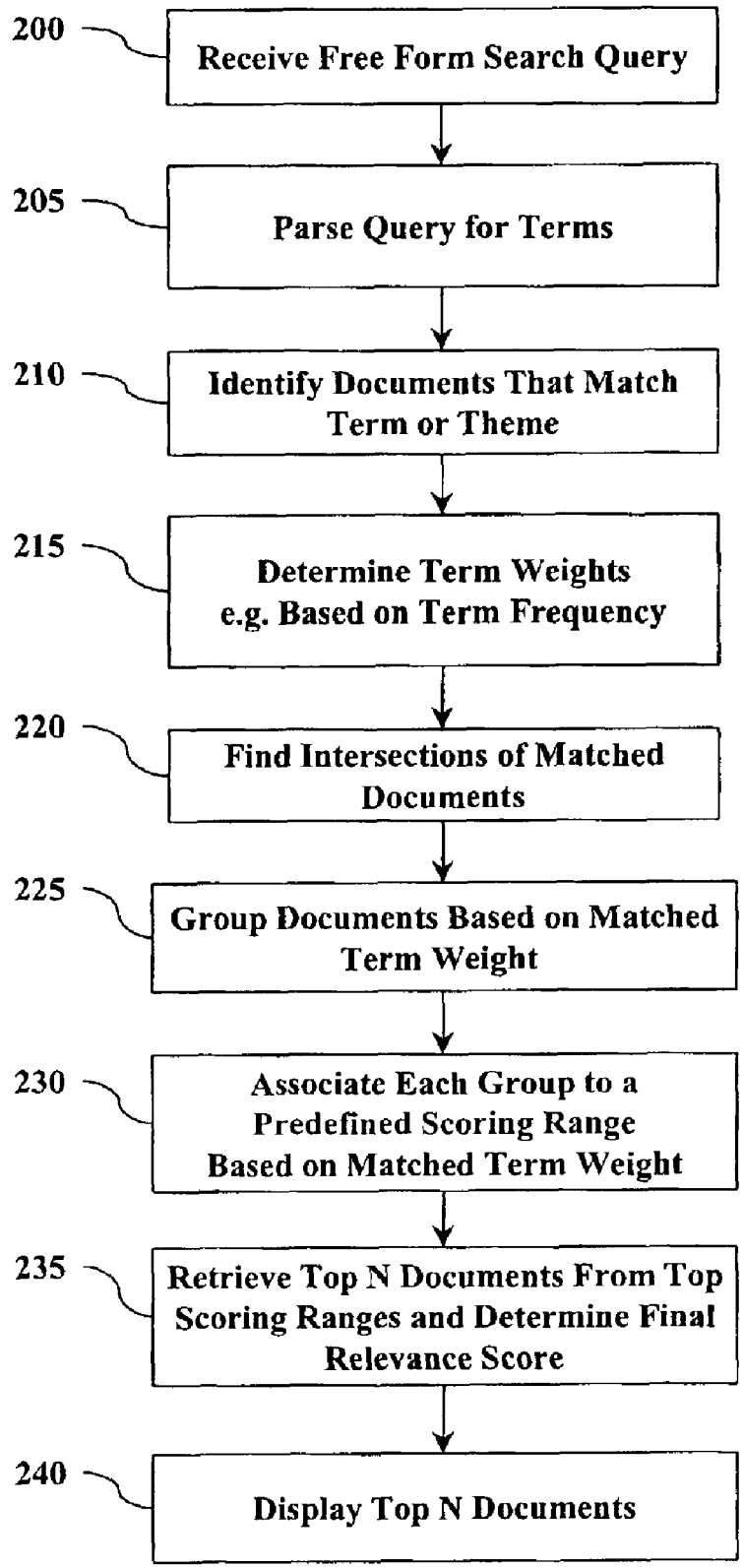
FIG. 2 is an exemplary methodology of retrieving and ranking documents in accordance with the present invention.

Illustrated in FIG. 2 is an exemplary computer-implemented methodology of processing a search query, ranking and retrieving candidate documents for relevance in accordance with the present invention. The blocks shown represent functions, actions or events performed therein. It will be appreciated that computer software applications involve dynamic and flexible processes and logic such that the illustrated blocks can be performed in other sequences different than the one shown. It will also be appreciated by one of ordinary skill in the art that the software of the present invention may be implemented using various programming approaches such as procedural, object oriented or artificial intelligence techniques.

With reference to FIG. 2, the process will be described using an exemplary search query of "oracle text adoption in Japan." The system receives the search query (block 200). For example, if using Oracle Text, the search query may be in the form "ABOUT(phrase)" where "phrase" can be a single word or a phrase, or a string of words in a free text format. Using the example query, it reads "ABOUT(oracle text adoption in Japan)." The ABOUT operator retrieves documents that contain themes or words that match the terms of the query. Typically, a database will have a theme component in its index to obtain better results using the ABOUT operator but it is not required. The search query is then parsed to identify terms, for example, term1 is "oracle text", term2 is "adoption" and term3 is "Japan" (block 205).

Once the terms from the query are identified, the system identifies documents that match one or more of the terms from the query or their themes (block 210) and builds a hitlist for each term. The hitlist can be a table, index, tree or the like that identifies which documents matched each term. Suppose that the selectivity of the terms are as follows in Table (1):

TABLE (1)

| Term | Document Hits |
|---|---|
| Oracle Text: | 1,000 |
| Adoption: | 50,000 |
| Japan: | 50,000,000 |

Each term from the query is assigned a term weight based on its occurrence frequency (block 215). Inverse frequency scoring is one algorithm that can be used. Terms that occur infrequently are assigned a greater term weight than terms that occur frequently. For this example, the term weights are assigned as 4 for "oracle text", 2 for "adoption", and 1 for "Japan."

By applying the term weights, it means that matching an uncommon word from the query is more important than matching a common word from the query. Since in the example above, Japan is a very common word compared to "oracle text", it is assumed that the user is more interested in finding a document that talks more about "oracle text" than a document that talks more about Japan.

Intersections are then determined between the documents to find which documents match more than one query term (Block 220). Let us assume that the selectivity of the intersections of the terms are as follows in Table (2):

TABLE (2)

| Term Intersections | Document Hits |
|---|---|
| oracle text & adoption: | 30 |
| oracle text & Japan: | 100 |
| adoption & Japan: | 1,000 |
| oracle text & adoption & Japan: | 5 |

A document receives a final relevance score as a function of each matched term relevance score and its term weight. The initial determination, however, is based on a document's matched term weights. A total score range is predetermined, for example, 0–100 where a score of 100 means a document is most relevant. Of course, other score ranges can be used. The total score range is divided into score bins as a function of the possible term weights that can be matched. An exemplary function is shown in Equation (1) below. For the present example, a simplified function is used as follows: the total possible term weights a document can have is seven (based on combinations of term weights 4, 2 and 1), so the total score range is divided into seven (7) score bins, one for each matched term weight value. Thus, the total score range of 100 is divided by seven (7). This defines seven (7) score bins each having a score range of about fourteen (14) values.

With further reference to FIG. 2, the documents are grouped together based on the sum of matched term weights (Block 225). Each document group is then associated to one of the predefined score ranges based on their matched term weights (Block 230). Using the above example of matched documents and matched terms, the following Table (3) is an exemplary classification of document groups associated to a particular score range:

TABLE (3)

| doc range | # of docs | matched terms | matched weight | score range |
|---|---|---|---|---|
| 1–5 | 5 | all | 7 | 87–100 |
| 6–30 | 25 | OT, adoption | 6 | 71–86 |
| 31–125 | 95 | OT, Japan | 5 | 57–70 |
| 126–1000 | 875 | OT | 4 | 43–56 |
| 1001–1995 | 995 | adoption, Japan | 3 | 29–42 |
| 1996–50970 | 48975 | adoption | 2 | 15–28 |
| 50971–5050875 | 49999905 | Japan | 1 | 1–14 |

As shown in Table (3), there are five (5) documents that matched all the terms. Thus, their matched term weight is 4+2+1=7 and these documents are assigned to the top score range of 87–100. For the documents that matched only "oracle text" (OT) and "Japan," their matched term weight is 4+1=5 and these documents are assigned to the fifth score bin having a range of 57–70.

In effect, documents are pre-classified into score ranges before actual relevance scores are computed for each document. By associating a document to a score range based on its matched term weight, documents matching weight M+1 are guaranteed to have a total relevance score more than documents matching weight M. In the above table, the group of five documents matching weight of 7 is guaranteed to contain the top five documents of the collection of candidate documents. The next 25 documents matching weight 6 are guaranteed to be the next 25 most relevant documents and so on.

With this pre-scoring association, the system does not have to retrieve all candidate documents or compute a total relevance score for every candidate document before it can determine which documents are most relevant. Rather, the system can process groups of documents based on decreasing matched weight. In the example above, if the system needs to find the top thirty (30) documents and return them to the user, it needs to evaluate the total relevance score for only thirty (30) documents. In this case, the top thirty documents are already identified in the top two scoring bins matching term weights of 6 and 7. This results in less processing time, less disk accesses and ultimately faster response time because the system does not need to retrieve and evaluate the total relevance score for all 5,050,875 candidate documents before documents having the top thirty relevance scores are found. Additionally, more accurate relevance scores are obtained.

With reference again to FIG. 2, after the documents are grouped into score ranges, a predetermined number N of most relevant documents are returned to the user as a resultant hitlist for the search query. From the score ranges based on decreasing term weight, a total relevance score is computed for each the top N documents to determine the relevance order between them (Block 235). An exemplary total relevance score is computed in Equation (1) as follows:

$$\text{score}=\min(s',100) \qquad (1)$$

given $s'=\text{round}(a'+b')$

Where $a'=((\text{sum of matched weight})-(\text{gcd of weights}))*100/\text{sum }(Wi)$ $$b' = \max(1, (\text{sum}(Wi*Si)/(\text{sum of matched weights}))*(\text{gcd of weights})/\text{sum}(Wi)$$

In equation (1) above, let Si represent the score produced by an individual term or branch of a query, let Wi represent the weight assigned to an individual term or branch and let sum (Wi) represent the mathematical sum of the weights Wi assigned to individual terms. As described above, using a total scoring range of 0–100, it is split into equal sized bins (or substantially equal size) as a function of the sum of term weights. For example, it can be based on (sum of term weights)/(gcd of weights) where "gcd" is the greatest common denominator. Using the gcd allows the system to find an optimal size of score bin. Based on the total term weight a document matches, the relevance score for the document is confined within a specific bin. Based on the scores for individual terms, the relevance score of the document is placed at a specific position within the bin. The value of a' determines which score range (bin) a document is assigned to and the value of b' determines the position of the document within that bin, Of course, other relationships can be used and will be appreciated by those of ordinary skill in the art.

For example, assume a document matches two terms, "adoption" and "Japan" and that the term relevance score for "adoption"=50 and for "Japan"=60. The term weight is 2 for "adoption" and 1 for "Japan." Thus, out of a possible total term weight of 7, the document has a total matched term weight of 3 putting the document in the 29–42 score range (using the above Table (3)). The final relevance score for a document can be found as:

$$\text{(Score Range) } a' = \frac{(3-1)*100}{7} = 28.57 \quad (2)$$

$$\text{(Location within range) } b' = \frac{(2*50 + 1*60)/3}{7} = 7.61 \quad (3)$$

$$\text{Final Score} = \text{Round}(a'+b') = 36 \quad (4)$$

Since the expected range of the score is determined based on the weight matched by the documents, a list of candidate documents can be isolated for top N hits by finding M (M>N) documents with highest matched weights. The final relevance scores are computed for the top N documents and the results are displayed to the user (Block 240), for example, by displaying links, addresses and/or other identifying information for each document. If only 5 most relevant documents are desired, the system only needs to retrieve the 5 documents associated to the highest score range which in this case are the 5 documents that match all three terms.

In another example using the Oracle Text system, the initial query ABOUT(oracle text adoption in Japan) is rewritten by the system to use an ACCUM operator as follows:

ABOUT (oracle text)*4 ACCUM about (adoption)*2 ACCUM about (japan)*1.

The "ACCUM" (ACCUMULATE) operator is an instruction to search for documents that contain at least one occurrence of any query term. Both the ABOUT and ACCUM operators are well known in Oracle systems. The ACCUM operator returns a relevance score for a document where the documents that contain the most occurrences for the highest number of query terms are assigned the highest score. The "*number" indicates a term weight, e.g. "*4". Incorporating the present invention, the score returned by the ACCUM operator is set to the score shown in Equation (1) above.

It will be appreciated by those of ordinary skill in the art that other scoring formulas can be used. The principle association is to associate a document's matched term weight to a particular score range. It will also be appreciated that the sequence of processing described above is only for exemplary purposes and that other sequences can be implemented. It will further be appreciated that the present invention is not limited to the text/information retrieval domain. Rather, it applies to any domain where the final ranking of an object depends on one or more of its attributes whether equally or unequally weighted). If some of the attributes can receive a score of zero for some of the objects, the present invention will work as well. In this manner, the information retrieval system 100 would be generically an object retrieval system.

With the present invention, a relationship is established between the total weight matched by a document and the range of the final score the document receives. Thus, the relevance for a document and its relevance in relation to all candidate documents are identifiable independently from the relevance of the other candidate documents. This provides for less computations, less document retrievals and, thus, faster response times for identifying and retrieving a set of most relevant documents from a large candidate set.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, relevance score ranges and rankings can be reversed where most relevant documents are assigned lower scores rather than higher scores. Term weights can be determined by other algorithms instead of inverse frequency scoring. Searching can be performed with or without indexes. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A computer-implemented method of optimizing a response time for retrieving relevant documents from a set of candidate documents identified in response to a search query where the search query includes one or more terms, the method comprising the steps of:

assigning alarm weight to each of the terms of the search query;

associating a document to a relevance score bin based on a total matched term weight computed for the document being based on a sum of the term weights of the terms in the search query that are matched by the document, where a document that matches a first total matched term weight is associated to a more relevant score bin than a document that matches a second total matched term weight that is less than the first total term weight; and retrieving a set of most relevant documents based on the association to the relevance score bins having a highest relevance score without retrieving other candidate documents.

2. The method as set forth in claim 1 further including determining a relevance of a document independently from other candidate documents based on the relevance score bin associated to the document.

3. The method as set forth in claim 1 further including determining a set of most relevant documents from the candidate documents based on the relevance score bin associated to the documents without determining an exact relevance score for all the candidate documents.

4. The method as set forth in claim 1 wherein assigning the term weight to a term is based on an inverse frequency scoring.

5. The method as set forth in claim 1 further including:

defining a total relevance score range; and defining one or more relevance score bins within the total relevance score range as a function of a total tern weight, the total term weight being a sum of the term weights from the search query.

6. The method as set forth in claim 5 wherein the total relevance score range is divided into the one or more relevance score bins each having an equal size.

7. A computer readable medium having computer executable instructions for performing a method for optimizing a response time for retrieving relevant documents from a set of candidate documents identified in response to a search query where the search query includes one or more terms, the method comprising the steps of:

assigning a term weight to each of the terms of the search query;

associating a document to a relevance score bin based on a total matched term weight where a document that matches a first total term weight is associated to a more relevant score bin than a document that matches a second total term weight that is less than the first total term weight; and retrieving a set of most relevant documents based on the association to the relevance score bins having a highest relevance score without retrieving other candidate documents.

8. An object retrieval system comprising:

a logic for processing a search query having one or more terms;

an object retrieval logic for identifying candidate objects that match the search query;

a ranking logic for assigning a term weight to each of the terms of the search query and associating each combination of matched term weights to a relevance score range, the ranking logic grouping the candidate objects based on the total matched term weight where an object that matches a first total term weight is associated to a more relevant score range than an object that matches a second total term weight that is less than the first total term weight; and a retrieval logic for retrieving a set of relevant objects associated to the relevance score ranges having a greatest total matched term weight without retrieving the candidate objects from other relevance score ranges.

9. The object retrieval system of claim 8 wherein the logic for processing the search query includes a parser that parses the search query to identify the terms.

10. The object retrieval system of claim 8 wherein the ranking logic includes:

logic for defining a total relevance score range; and logic for defining the relevance score ranges within the total relevance score range as a function of possible term weights that an object can match.

11. The object retrieval system of claim 8 wherein the retrieval logic includes logic for retrieving only objects from the candidate objects that match a highest value of the term weights.

12. The object retrieval system of claim 8 wherein the ranking logic includes means for associating document relevance scores to the relevance ranges based on matched term weight.

13. A computer-implemented method of retrieving most relevant documents from a set of candidate documents that match a search query having one or more terms, the method comprising:

assigning a term weight to each of the terms in the search query;

defining a total relevance score range and a plurality of score bins therein;

establishing a relationship between a total term weight matched by a document and a score bin within the total relevance score range;

associating a score bin to a document based on the total term weight matched by the document; and retrieving the most relevant documents based on the score bins.

14. The method as set forth in claim 13 wherein associating includes associating a score bin to a document such that a final relevance score of the document is limited to the score bin and the most relevant documents are identifiable without having to determine a final relevance score for all the candidate documents.

15. The method as set forth in claim 13 wherein retrieving the most relevant documents includes retrieving documents that match a highest term weight associated to a highest score bin without retrieving documents associated to other score bins.

16. The method as set forth in claim 13 wherein a score bin is associated to a document such that a document that matches a first total term weight is associated to a more relevant score bin than a document that matches a second total term weight that is lees than the first total term weight.

17. The method as set forth in claim 13 wherein the assigning a term weight is based on an inverse frequency scoring.

18. The method as set forth in claim 13 wherein the associating allows the most relevant documents to be identified independently from the other candidate documents.

19. The method as set forth in claim 13 further including displaying the most relevant documents to a user.

20. A computer readable medium having computer executable instructions for performing a method for retrieving most relevant documents from a set of candidate documents that match a search query having one or more terms, the method comprising:

assigning a term weight to each of the terms;

defining a total relevance score range and a plurality of score bins therein;

establishing a relationship between a total term weight matched by a document and a score bin within the total relevance score range;

associating a score bin to a document based on the total term weight matched by the document; and retrieving the most relevant documents based on the score bins.

21. A computer-implemented method of optimizing a response time for retrieving relevant documents from a set of candidate documents identified in response to a search query where the search query includes one or more terms, the method comprising:

assigning a term weight to each of the terms in the search query, computing a total matched term weight for a document by matching the terms in the search query to terms associated with the document and summing the term weights of the terms in the search query that match the terms associated with the document, whore the terms associated with the document are stored in an index;

associating the document with a relevance score bin based on a total matched term weight, where a first document with a first total term weight in a first relevance range is associated with a first score bin associated with more relevant documents than a second document with a second total term weight in a second relevance range; and selectively retrieving a subset of a set of documents, where the subset includes documents associated with one or more relevance score bins.

22. The method of claim 21, where the relevance range is computed dynamically based, at least in part, on the sum of the term weights from the search query.

23. The method of claim 21, where the relevance range is computed dynamically based on the sum of the term weights from the search query divided by a greatest common denominator of the term weights.

* * * * *

UNITED STATES PATENT AND TRADEMARK OFFICE
CERTIFICATE OF CORRECTION

PATENT NO. : 6,947,920 B2
DATED : September 20, 2005
INVENTOR(S) : Alpha

It is certified that error appears in the above-identified patent and that said Letters Patent is hereby corrected as shown below:

Column 8,
Line 51, "alarm" should read -- a term --.

Column 9,
Line 14, "tern" should read -- term --.

Column 10,
Line 40, "lees" should read -- less --.

Column 11,
Line 10, "whore" should read -- where --.

Signed and Sealed this

Twenty-seventh Day of December, 2005

JON W. DUDAS
*Director of the United States Patent and Trademark Office*